(12) United States Patent
Matthews et al.

(10) Patent No.: US 12,197,932 B2
(45) Date of Patent: Jan. 14, 2025

(54) METHOD AND SYSTEM FOR SUPPLEMENTING AND PROVIDING ENHANCEMENTS TO TARGET SOFTWARE DATA ENTRIES

(71) Applicant: Meetings Strategy, Inc., Chicago, IL (US)

(72) Inventors: Peter Matthews, Chicago, IL (US); Kimberly Meyer, Chicago, IL (US)

( * ) Notice: Subject to any disclaimer, the term of this patent is extended or adjusted under 35 U.S.C. 154(b) by 0 days.

(21) Appl. No.: 17/454,155

(22) Filed: Nov. 9, 2021

(65) Prior Publication Data

US 2022/0147377 A1    May 12, 2022

Related U.S. Application Data

(60) Provisional application No. 63/111,404, filed on Nov. 9, 2020.

(51) Int. Cl.
| | | |
|---|---|---|
| *G06F 9/451* | (2018.01) | |
| *G06F 3/04842* | (2022.01) | |
| *G06F 9/445* | (2018.01) | |
| *G06F 9/54* | (2006.01) | |
| *G06F 16/215* | (2019.01) | |
| *G06F 16/242* | (2019.01) | |
| *G06F 16/9032* | (2019.01) | |
| *G06Q 10/1093* | (2023.01) | |

(52) U.S. Cl.
CPC .......... *G06F 9/453* (2018.02); *G06F 3/04842* (2013.01); *G06F 9/44526* (2013.01); *G06F 9/54* (2013.01); *G06F 16/215* (2019.01); *G06F 16/242* (2019.01); *G06F 16/2425* (2019.01); *G06F 16/90324* (2019.01); *G06Q 10/1095* (2013.01)

(58) Field of Classification Search
CPC .... G06F 9/453; G06F 3/04842; G06F 16/215; G06F 16/242; G06F 16/90324; G06Q 10/1095
See application file for complete search history.

(56) References Cited

U.S. PATENT DOCUMENTS

| | | | | |
|---|---|---|---|---|
| 6,654,932 B1 * | 11/2003 | Bahrs | .................. | G06F 8/38 715/764 |
| 8,346,791 B1 * | 1/2013 | Shukla | ................ | G06F 16/3338 707/759 |
| 10,417,613 B1 * | 9/2019 | Brisebois | ............... | G06F 21/554 |
| 11,283,888 B2 * | 3/2022 | Joseph | ................... | G06N 5/022 |

(Continued)

*Primary Examiner* — Justin R. Blaufeld
(74) *Attorney, Agent, or Firm* — McDonnell Boehnen Hulbert & Berghoff LLP

(57) ABSTRACT

A guidance system and method to supplement the functionality of software programs in a manner that is not native to a target software to guide and enable a user to provide more complete and correct information in real time and hence have better information available at a lower cost. The system provides onscreen, real time guidance, reports and suggested answers for data entry, and actions at particular points in the user's workflow within a primary system. The guidance system may present data in a predetermined format based on algorithms which consider aspects of the user and the users previous actions, the location of the user in the target system, the context of other data inside and external to the target system, and ongoing artificial intelligence of the guidance system.

18 Claims, 13 Drawing Sheets

(56) References Cited

U.S. PATENT DOCUMENTS

| | | | | |
|---|---|---|---|---|
| 11,853,937 | B1* | 12/2023 | Porrata | G06N 3/08 |
| 2003/0103656 | A1* | 6/2003 | Lapstun | G06Q 20/3674 |
| | | | | 382/113 |
| 2005/0102607 | A1* | 5/2005 | Rousselle | G06F 40/166 |
| | | | | 715/209 |
| 2008/0027958 | A1* | 1/2008 | Kapoor | G06F 16/254 |
| 2009/0282033 | A1* | 11/2009 | Alshawi | G06F 16/9032 |
| | | | | 707/999.005 |
| 2010/0125541 | A1* | 5/2010 | Wendel | G06F 9/451 |
| | | | | 715/710 |
| 2010/0275118 | A1* | 10/2010 | Iakobashvili | G06F 40/253 |
| | | | | 715/810 |
| 2011/0078259 | A1* | 3/2011 | Rashad | G06Q 10/107 |
| | | | | 706/54 |
| 2011/0243313 | A1* | 10/2011 | Couse | G06Q 10/109 |
| | | | | 379/93.02 |
| 2015/0363437 | A1* | 12/2015 | Florez | G06F 11/0724 |
| | | | | 707/692 |
| 2017/0236060 | A1* | 8/2017 | Ignatyev | G06N 5/01 |
| | | | | 706/46 |
| 2017/0330099 | A1* | 11/2017 | de Vial | G06Q 40/04 |
| 2018/0052871 | A1* | 2/2018 | Bach | G06F 16/958 |
| 2018/0143745 | A1* | 5/2018 | Ashok | G06F 16/3325 |
| 2019/0364154 | A1* | 11/2019 | Hermanek | G06N 5/022 |
| 2020/0110755 | A1* | 4/2020 | Waldman | G06F 3/0484 |
| 2020/0117718 | A1* | 4/2020 | Lundberg | G06F 16/353 |
| 2020/0167522 | A1* | 5/2020 | Cervelli | G06F 40/18 |
| 2021/0026821 | A1* | 1/2021 | Glidden | H04L 63/0414 |
| 2021/0149963 | A1* | 5/2021 | Agarwal | G06F 16/90332 |

* cited by examiner

Meeting Requests

View: [My Requests ▾] [▽] [✿▾] [Create View]　　　　　[2 Reminders (WIP)] [Submit Meeting Request]

| Name | ◇ | Request Code ◇ | Request Status | Submitted ◇ | Meeting Type ◇ | Total Attendees ◇ | RFPs ◇ |
|---|---|---|---|---|---|---|---|
| Meeting Management Kaizen | ▷ | FTNHPTCKHGQ | Requested | 7/2/2020 | Advisory Board | 7 | No |
| Future Leaders Beyond the Basics | ▷ | M5NDRGW9KXX | Contracting | 2/27/2020 | Sales | 51 | No |
| GSD for Beginners July 2020 | ▷ | KPNWX5GMP32 | Contracting | 2/27/2020 | Sales | 54 | No |
| Advanced GSD Course Nov 2020 | ▷ | G9NC4KGMPND | Planning | 2/27/2020 | Sales | 47 | Yes |
| TRANSFER TEAM TEST ALL FIELDS - DO NOT DELETE | ▷ | LJNGB2JB2MX | Requested | 1/31/2020 | Advisory Board | 98 | No |

Results per page [200 ▾]　　Displaying results 1 - 5 of 5　　　　　 |◀ ◀ 1 ▶ ▶|

Meeting Budget - Expense Summary

General Information

| | |
|---|---|
| Title | Advanced GSD Course Nov 2020 |
| Start Date | Monday, 23 Nov 2020 |
| End Date | Tuesday, 24 Nov 2020 |
| Meeting ID | G9NC4KGMPND |
| Meeting Type | Sales |

| | |
|---|---|
| Location | Hilton Cincinnati Netherland Plaza |
| City | Cincinnati |
| Country | USA |
| Total Attendees | 47 |
| Report Date | Wednesday, 15 Jul 2020 |

| Subcategory Name | Item | Vendor | Quantity | Current Price | Initial Cost | Current Cost | Savings |
|---|---|---|---|---|---|---|---|
| Accommodation Expenses | | | | | 56,870.00 | 57,750.00 | -880.00 |
| Double Room | Double Rooms | Palace Hotel Antarctica | 1 | 16,500.00 | 20,570.00 | 18,150.00 | 2,420.00 |
| Single Room | November 23 | Palace Hotel Antarctica | 100 | 185.00 | 18,150.00 | 20,350.00 | -2,200.00 |
| | November 24 | Palace Hotel Antarctica | 100 | 175.00 | 18,150.00 | 19,250.00 | -1,100.00 |
| Food and Beverage | | | | | 14,300.00 | 13,195.00 | 1,105.00 |
| AM Break | Morning Break | Palace Hotel Antarctica | 50 | 31.50 | 2,275.00 | 2,047.50 | 227.50 |
| Dinner | Dinner | Palace Hotel Antarctica | 50 | 80.00 | 5,525.00 | 5,200.00 | 325.00 |
| Lunch | Day 1 | Palace Hotel Antarctica | 50 | 60.00 | 4,225.00 | 3,900.00 | 325.00 |
| PM Break | Afternoon Break | Palace Hotel Antarctica | 50 | 31.50 | 2,275.00 | 2,047.50 | 227.50 |
| Total | | | | | 71,170.00 | 70,945.00 | 225.00 |

| | Initial Cost | Current Cost | Savings |
|---|---|---|---|
| Total Meeting Expenses | 71,170.00 | 70,945.00 | 225.00 |
| Estimated Commission | 0.00 | 100.00 | 0.00 |
| Net Meeting Cost | 71,170.00 | 70,845.00 | 325.00 |
| Net Cost per Attendee | 1,423.40 | 1,416.90 | 6.50 |

Legend
* Includes applicable Tax and Gratuity
** Actual Commission may vary
*** As defined in the meeting Profile

Figure 10

Meeting Requests

View: | My Requests ∨ | | ▷ | ☼∨ | Create View |

Team Performance | 2 Reminders (WiP) | Submit Meeting Request

← 1102

| Name ◇ | Request Code ◇ | Request Status ◇ | Submitted ◇ | Meeting Type ◇ | Total Attendees ◇ | RFPs ◇ |
|---|---|---|---|---|---|---|
| Meeting Management Kaizen | FTNHPTCKHGQ | Requested | 7/2/2020 | Advisory Board | 7 | No |
| Future Leaders Beyond the Basics | M5NDRGW9KXX | Contracting | 2/27/2020 | Sales | 51 | No |
| GSD for Beginners July 2020 | KPNWX5GMP32 | Contracting | 2/27/2020 | Sales | 54 | No |
| Advanced GSD Course Nov 2020 | G9NC4KGMPND | Planning | 2/27/2020 | Sales | 47 | Yes |
| TRANSFER TEAM TEST ALL FIELDS - DO NOT DELETE | LJNGB2JB2MX | Requested | 1/31/2020 | Advisory Board | 98 | No |

Results per page 200 ∨    Displaying results 1 - 5 of 5    |◁ ◁ 1 ▷ ▷|

METHOD AND SYSTEM FOR SUPPLEMENTING AND PROVIDING ENHANCEMENTS TO TARGET SOFTWARE DATA ENTRIES

CROSS-REFERENCE TO RELATED APPLICATION

This application claims priority to U.S. provisional patent application No. 63/111,404, filed Nov. 9, 2020, which is hereby incorporated by reference in its entirety.

BACKGROUND

Commercial software exists in many industries to capture, store, manage, and report on information related to business processes. In corporations, specialty software is used to manage finance and accounting, sales, manufacturing, human resources, and meeting and event planning, to name a few. Meeting and event planning, as one example, requires managing an enormous amount of information and details. A large meeting or event (hereafter called "meeting") may entail arranging for the flights of thousands of participants to a location, their accommodation at multiple hotels, and their attendance at meetings, meals, networking activities and entertainment activities. A meeting planner may use hundreds of vendors to provide the services of arranging meeting rooms and audio visual services, speakers for presenting at meetings, producing meals, entertainment, gifts, leisure activities, and the like. Meeting planners need to capture all of the details of managing many aspects of the attendees experience before, during, and after the event, as well as contracting and managing the vendors who contribute to produce the meeting or event.

The commercial software that exists to support this process is only as useful as the data entered into the software by individuals, and historically, users of the software (meeting planners) can miss or enter incorrect data into the software many times over the course of a single event or meeting. Planners rely on reports from the software to manage these events. Managers and executives in the organization also rely on reporting to manage the business of these events, including but not limited to the cost of the event and the safety of the attendees. Without accurate and complete information, it is difficult for the meeting planner to effectively manage the one, five, or twenty meetings they are working on. Simultaneously, executives are trying to effectively manage an entire meetings "program" or portfolio of thousands of meetings that a corporation or organization may hold in a single year. Without accurate data, executives are at a significant disadvantage in understanding shortfalls and opportunities to make decisions related to an individual event or an entire meetings and event program. For example, a manager could assume a meeting spend was approximately $4 million based on a report directly from the software. However, once missing or invalid data is corrected that number could be $10 million, causing the manager to make very different decisions.

Currently, commercial software could include built in field validation. Although some rudimentary data validation exists, it is severely limited. For example, the field may specify a type of data that can be entered, but the software will not check to make sure if the data entered make sense. Further, even if a field identifies an error, it may not provide any guidance for correcting the error.

Today, if missing or incorrect data are suspected, the best processes available to review and correct the data are either highly manual and arduous or semi-automated but far too slow. Neither of these methods is considered to be cost-effective. For the manual method, an analyst needs to take several downloads of the data from the target software, often in excel files, format the data, combine the data, comb through the data line by line to find errors, and contact each person with an error to request adjustment. In the semi-automated method, some analysts may have built their own offline automated business rules to check the data to shorten the process, or hired a vendor to do that work. Both methods require a large financial commitment and support structure. In both methods, a person or system still needs to communicate the issues to users, typically by email and in the user's preferred language, wait for the users to respond, and then follow up to see if users have corrected their mistakes. If the users have questions about the missing information or error, there may be a long email exchange over many weeks and/or multiple phone calls. In the meantime, the system may be providing reports containing information errors, and decisions could still be being made based on the erroneous information.

Similar to the process of finding errors, the process to produce complex reports requires many steps of extracting and combining data using external systems and then emailing or posting reports for individuals to retrieve. Current processing is time consuming, expensive, and requires users to go to other systems to retrieve reports. In light of these difficulties, new approaches are needed to overcome the limitations pervasive in the software platforms being used to manage such complex data sets.

BRIEF SUMMARY

In one aspect, the present application describes a non-transitory computer-readable medium having computer-executable instructions stored thereon. If executed by a computing system, the instructions may cause the computing system to perform operations including receiving, by the computing system from a user, a plurality of data entries via a graphical user interface, determining an error in at least one of the plurality of data entries, determining, based on the error, a plurality of responses, wherein the plurality of responses includes at least one of a suggestion, or request for correction of information, providing guidance to the user based on the determined plurality of responses via the graphical user interface, receiving, from the user, a guidance selection, and displaying, based on the guidance selection, a correction of the erroneous data via the graphical user interface.

In a second aspect, the present application describes a method. The method can include receiving, by the computing system from a user, a plurality of data entries via a graphical user interface, determining an error in at least one of the plurality of data entries, determining, based on the error, a plurality of responses, wherein the plurality of responses includes at least one of a suggestion, or request for correction of information, providing guidance to the user based on the determined plurality of responses via the graphical user interface, receiving, from the user, a guidance selection, and displaying, based on the guidance selection, a correction of the erroneous data via the graphical user interface.

In an additional aspect, the present application describes a method including receiving, by a computing system from a user, a request for a report based on a plurality of fields. Based on receiving the request, the method can include determining that at least one field was left blank. The method can further include completing, based on a trained machine learning model, the at least one blank field, and outputting the report.

An example embodiment may include a method for supplementing the functionality of a target software program in a manner that is not native to the target software to improve on historical processes by identifying errors or providing guidance and/or suggested appropriate answers at the time of data entry into the software rather than after the fact. The method may allow users to consider, validate, interact with, and correct multiple types of data with simple instructions based on the particular issue and in real time whilst using an existing software program or database but whilst the user is committing data to the existing software or database. Hence, users may be able to choose better answers or correct errors in real time, and may be far more efficient than needing to return to the software days, weeks, and months later to correct past errors. Hence, labor costs associated with maintaining good data could decrease significantly. Management can have cleaner and more accurate data for decision making purposes at all times rather than waiting until the end of the month or quarter for clean-up processes to be completed. The real-time validation provides better user experience and better reporting for decision making.

BRIEF DESCRIPTION OF THE DRAWINGS

FIG. 6B illustrates a reminder display, in accordance with example embodiments.

FIG. 10 illustrates a custom report, in accordance with example embodiments.

FIG. 11 illustrates a display to run manager reports, in accordance with example embodiments.

DETAILED DESCRIPTION

The description herein is given by way of example, and not limitation. One skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

Users of a target software, such as Cvent software for meeting and event planning, may record thousands of details about a meeting or event during a planning process which occurs over weeks or years. Cvent is a leading meetings, events, and hospitality technology provider. Cvent software provide tools for event planners and marketers for online event registration, venue selection, event management and marketing, virtual, hybrid, and in-person meeting management. At times, the users of the software may miss including an important field of information, enter information incorrectly, or need to go back to information they entered months before and update that information as some aspect of the meeting changes. It is a time-consuming and frustrating process to find and update all errors and missing information, and is problematic for software users and those who need to report on information captured by the software.

The present disclosure provides a method for detecting and prompting users to correct these errors and update missing information. Specifically, the present disclosure provides a non-transitory computer readable medium having computer-executable instructions stored thereon which are run in conjunction with a target software in order to flag errors, correct any errors, or provide additional guidance for updating data that was entered into the target software. The computer-executable instructions could be integrated within the target software, or alternatively, it could be a separate application programming interface.

Figure 1:
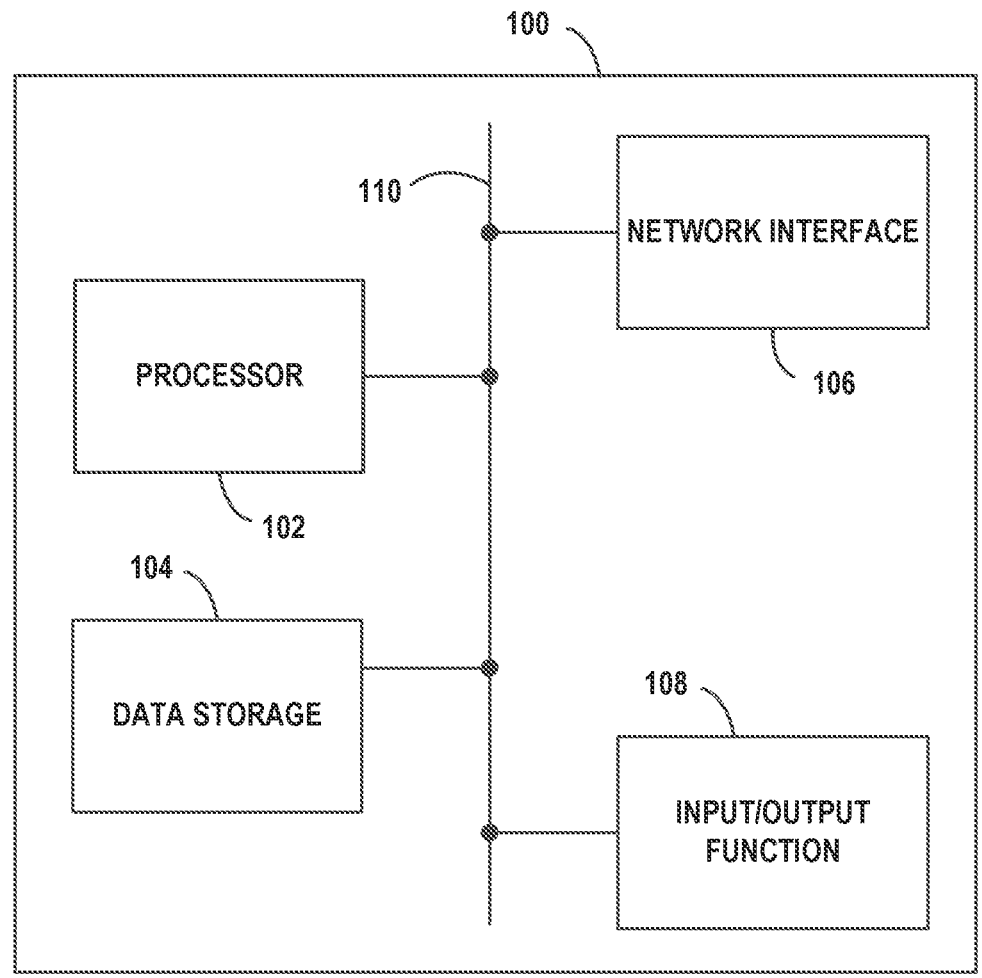
FIG. 1 illustrates a computing device, in accordance with example embodiments.

FIG. 1 is a simplified block diagram exemplifying a computing device 100, illustrating some of the functional components that could be included in a computing device arranged to operate in accordance with the embodiments herein. Example computing device 100 could be a personal computer (PC), laptop, server, or some other type of computational platform. For purposes of simplicity, this specification may equate computing device 100 to a server from time to time, and may also refer to some or all of the components of computing device 100 as a "processing unit." Nonetheless, it should be understood that the description of computing device 100 could apply to any component used for the purposes described herein.

In this example, computing device 100 includes a processor 102, a data storage 104, a network interface 106, and an input/output function 108, all of which may be coupled by a system bus 110 or a similar mechanism. Processor 102 can include one or more CPUs, such as one or more general purpose processors and/or one or more dedicated processors (e.g., application specific integrated circuits (ASICs), graphical processing units (GPUs), digital signal processors (DSPs), network processors, etc.).

Data storage 104, in turn, may comprise volatile and/or non-volatile data storage and can be integrated in whole or in part with processor 102. Data storage 104 can hold program instructions, executable by processor 102, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 104 may contain program instructions, perhaps stored on a non-transitory, computer-readable medium, executable by processor 102 to carry out any of the methods, processes, or functions disclosed in this specification or the accompanying drawings.

Network interface 106 may take the form of a wireline connection, such as an Ethernet, Token Ring, or T-carrier connection. Network interface 106 may also take the form of a wireless connection, such as IEEE 802.11 (Wife), BLUETOOTH®, or a wide-area wireless connection. However, other forms of physical layer connections and other types of standard or proprietary communication protocols may be used over network interface 106. Furthermore, network interface 106 may comprise multiple physical interfaces.

Input/output function 108 may facilitate user interaction with example computing device 100. Input/output function 108 may comprise multiple types of input devices, such as a keyboard, a mouse, a touch screen, and so on. Similarly, input/output function 108 may comprise multiple types of output devices, such as a screen, monitor, printer, or one or more light emitting diodes (LEDs). Additionally or alternatively, example computing device 100 may support remote access from another device, via network interface 106 or via another interface (not shown), such as a universal serial bus (USB) or high-definition multimedia interface (HDMI) port.

In some embodiments, one or more computing devices may be deployed in a networked architecture. The exact physical location, connectivity, and configuration of the computing devices may be unknown and/or unimportant to client devices. Accordingly, the computing devices may be referred to as "cloud-based" devices that may be housed at various remote locations.

Figure 2:
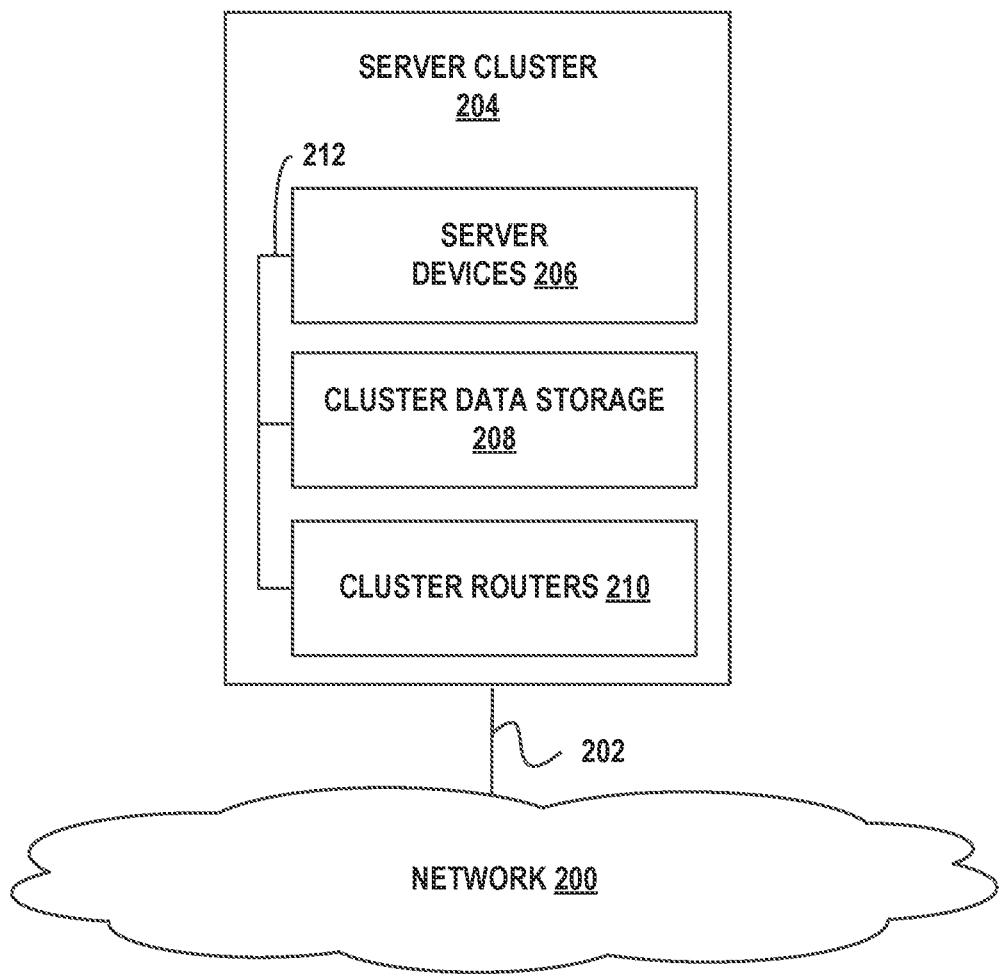
FIG. 2 illustrates a clustered computing device, in accordance with example embodiments.

FIG. 2 depicts a cloud-based server cluster 204 in accordance with an example embodiment. In FIG. 2, functions of computing device 100 may be distributed between server devices 206, cluster data storage 208, and cluster routers 210, all of which may be connected by local cluster network 212. The number of server devices, cluster data storages, and cluster routers in server cluster 204 may depend on the computing task(s) and/or applications assigned to server cluster 204.

For example, server devices 206 can be configured to perform various computing tasks of computing device 100. Thus, computing tasks can be distributed among one or more of server devices 206. To the extent that these computing tasks can be performed in parallel, such a distribution of tasks may reduce the total time to complete these tasks and return a result.

Cluster data storage 208 may be data storage arrays that include disk array controllers configured to manage read and write access to groups of hard disk drives and/or solid state drives. The disk array controllers, alone or in conjunction with server devices 206, may also be configured to manage backup or redundant copies of the data stored in cluster data storage 208 to protect against disk drive failures or other types of failures that prevent one or more of server devices 206 from accessing units of cluster data storage 208.

Cluster routers 210 may include networking equipment configured to provide internal and external communications for the server clusters. For example, cluster routers 210 may include one or more packet-switching and/or routing devices configured to provide (i) network communications between server devices 206 and cluster data storage 208 via cluster network 212, and/or (ii) network communications between the server cluster 204 and other devices via communication link 202 to network 200.

Additionally, the configuration of cluster routers 210 can be based at least in part on the data communication requirements of server devices 206 and cluster data storage 208, the latency and throughput of the local cluster network 212, the latency, throughput, and cost of communication link 202, and/or other factors that may contribute to the cost, speed, fault-tolerance, resiliency, efficiency and/or other design goals of the system architecture.

As noted, server devices 206 may be configured to transmit data to and receive data from cluster data storage 208. This transmission and retrieval may take the form of SQL queries or other types of database queries, and the output of such queries, respectively. Additional text, images, video, and/or audio may be included as well. Furthermore, server devices 206 may organize the received data into web page or web application representations. Such a representation may take the form of a markup language, such as the hypertext markup language (HTML), the extensible markup language (XML), or some other standardized or proprietary format. Moreover, server devices 206 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® or other languages may be used to facilitate generation of web pages and/or to provide web application functionality.

In an example embodiment discussed in the context of the target software Cvent, while users are working in the target software, the computer-executable instructions could provide for the users to be served up (or shown onscreen) pop-up windows and extra "buttons" on their Cvent screens at specific and appropriate times. This "helper" information could appear when it is necessary to complete or correct a data entry, at a time when a user needs guidance on how to complete a particular process, or to allow the user to print a helpful pre-formatted report. The operations performed by executing the instructions stored in the non-transitory computer readable medium could include using the helper to provide suggested appropriate answers at the time the user enters incorrect data or otherwise needs help to enter correct information. The pop-up helper could also appear "on demand" when a Cvent user requests to spend time on any outstanding issues in the system. In an alternative example embodiment, if the user is busy with another task in the target software when the pop-up helper appears, the user could request that the pop-up disappear and that the helper remind them about the issue at some later time. It should be understood that operations described as being performed by one or more entities could be implemented in various ways, such as by a processor executing instructions stored in non-transitory data storage, along with associated circuitry or other hardware, among other possibilities.

An example embodiment may provide a tool to allow users to validate, interact with data, enter valid data, or correct data in real time. An example embodiment may be able to record details of a user and a user's actions when using the target system and provide those details to managers who need to evaluate such data. By being real-time focused, each data point could be evaluated at the point in time and be "context specific" based on what is already logged in the target system, rather than data outliers being detected in final reports. The data in the target system, when using the present operations in an example embodiment, could ultimately achieve a higher "success rate" (whereby success is timely and correct data being collected). This "context specific" element is underpinned by logic processing, which in turn warrants that the most relevant data validation events are executed to maintain a fast response time, and the most relevant supplemental features are available to specific users.

Figure 3:
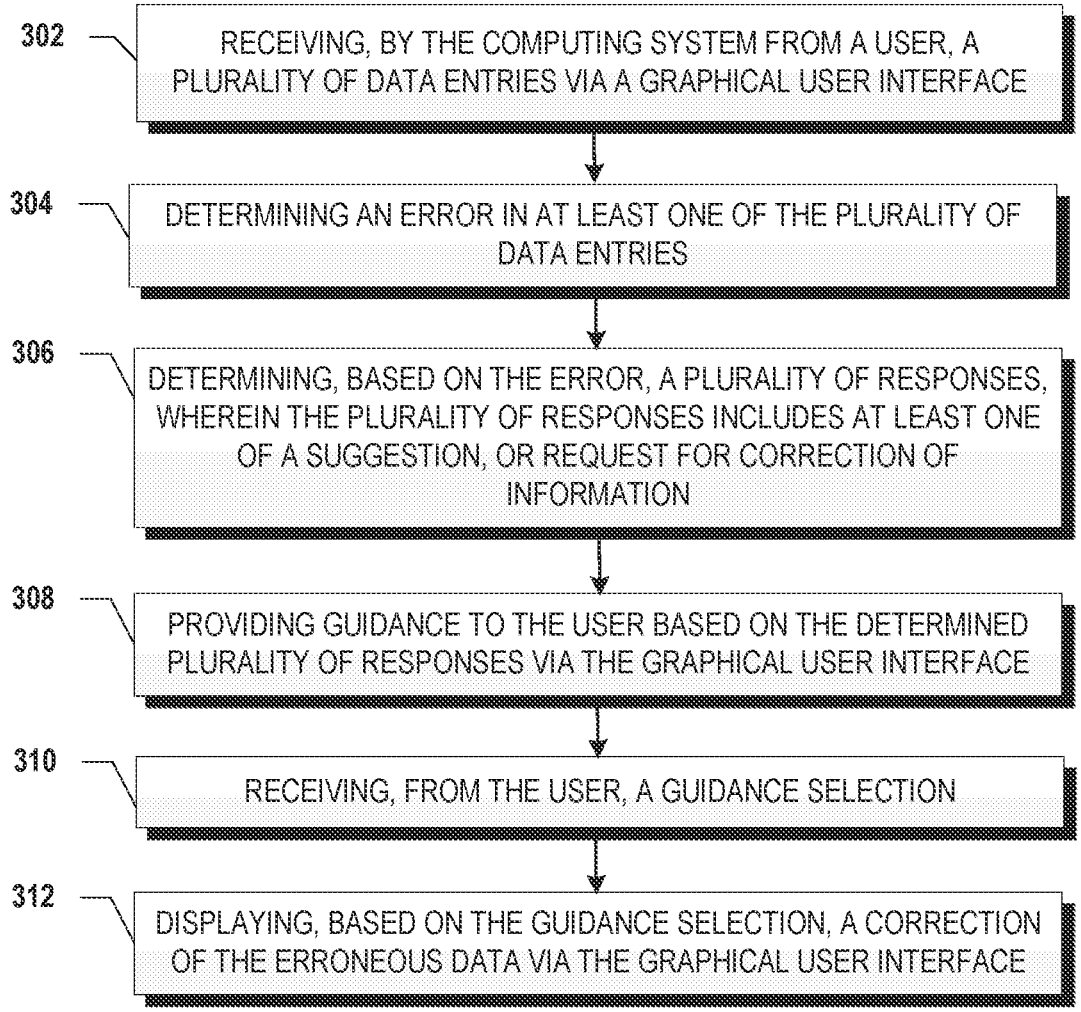
FIG. 3 illustrates a flow chart, in accordance with example embodiments.

FIG. 3 illustrates a flow chart illustrating an example embodiment 300. The process illustrated by FIG. 3 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device. The process can also be the method described herein.

The embodiments of FIG. 3 may be simplified by the removal of any one or more of the features shown therein. Further, these embodiments may be combined with features, aspects, and/or implementations of any of the previous figures or otherwise described herein.

Block 302 may involve receiving, by the computing system from a user, a plurality of data entries via a graphical user interface. In some embodiments, the plurality of data entries includes at least one or more values associated with planning a meeting or locations for planning a meeting.

Block 304 may involve determining an error in at least one of the plurality of data entries. Block 306 may involve determining, based on the error, a plurality of responses, wherein the plurality of responses includes at least one of a suggestion, or request for correction of information.

Block 308 providing guidance to the user based on the determined plurality of responses via the graphical user interface.

Block 310 receiving, from the user, a guidance selection and block 312 can include displaying, based on the guidance selection, a correction of the erroneous data via the graphical user interface.

The embodiment in method 300 can also include instructing a user to re-enter an answer until the answer is correct. For example, if the user enters their own incorrect answer, the method can include starting again at block 302. The method can include informing the user that the answer is incorrect until the user corrects their answer or chooses something provided by the system. The method can include making a determination of an error using the machine learning algorithm described herein.

Figure 4:
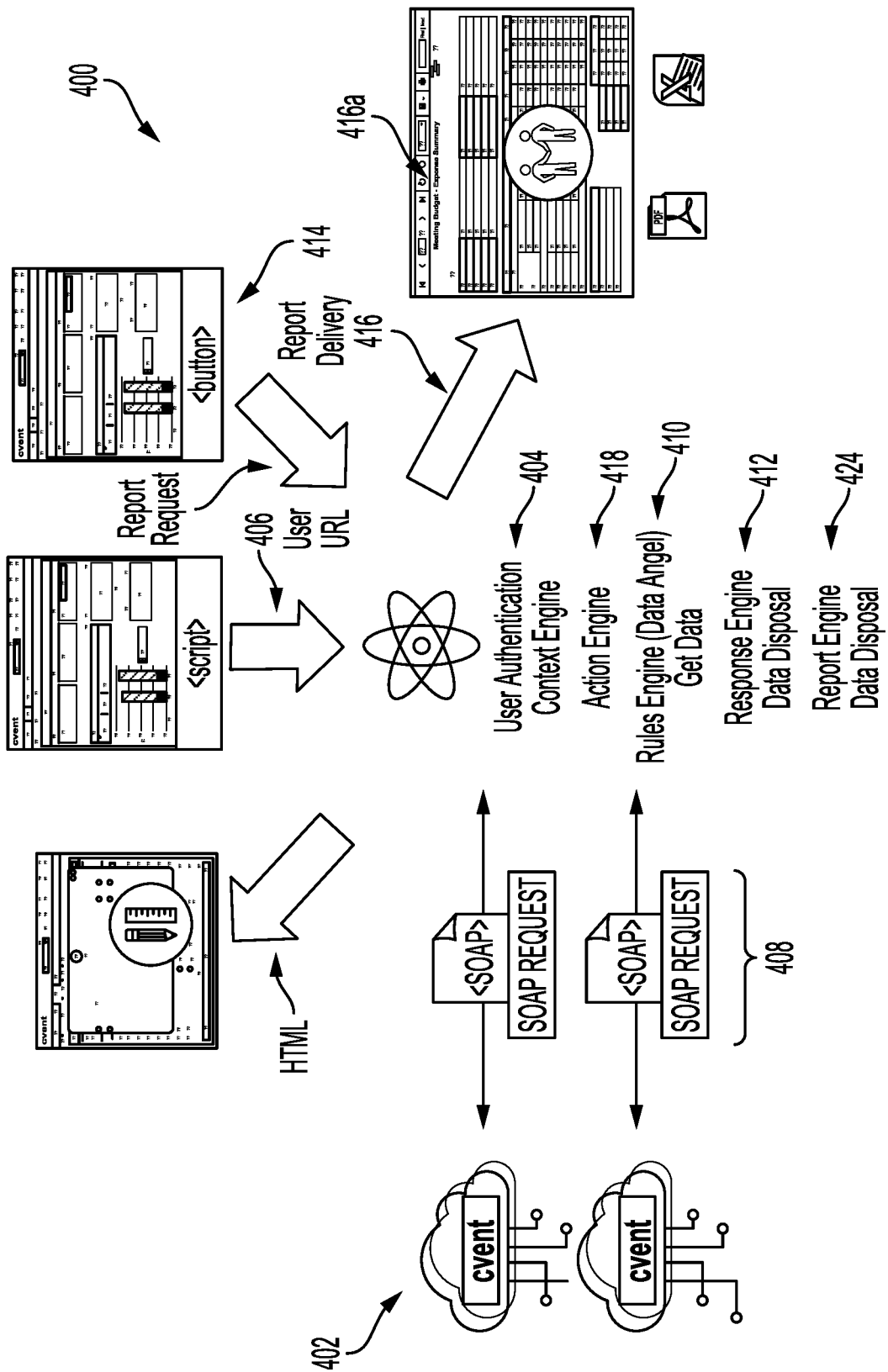
FIG. 4 illustrates a high-level data flow, in accordance with example embodiments.

FIG. 4 illustrates an example embodiment 400 of the high-level data flow between the target software and the software implementing the operations executed by the instructions stored on the non-transitory computer readable medium disclosed here within. Users log into the target software, of which the software Cvent 402 is used in this example. As a user moves within screens of the Cvent software to do work, in an example embodiment the operations may include using the Cvent application programming interface ("API") to authenticate the user from Cvent with a user authentication context engine 404. In an example embodiment, the operations may include using the Cvent API to retrieve user URL 406 information about the particular user, current information about a meeting that the user is working on, and all meetings in Cvent that the particular user is involved with. This may be accomplished by using SOAP requests 408.

In an example embodiment, the operations could also be implemented in a cloud based environment. The cloud based environment could also evaluate the data using algorithms and artificial intelligence. For example, an embodiment may include using a machine learning algorithm to "learn" what data entries are the most correct and subsequently present the "correct" determinations to the user for entry into data fields. Machine learning algorithms use 1) stored libraries of answers to suggest most appropriate answers and "learn" from new answers that users provide, or 2) compare data against data from other fields in the Cvent system or other data temporarily available in the cloud for review to choose the best answer. For example, the library has 30,000 city names from cities most used for meetings from around the world. If a user enters a city not in the database, the algorithm will "learn" the new city and suggest it in the future. This machine learning algorithm can be used throughout the described method.

Two methods exist for checking new data. In the first method, the system will check another data source (e.g. the stored libraries of answers, data from other fields in the Cvent system, or other data temporarily available in the cloud for the best answer) on a scheduled basis to ensure the "new" data should become part of its available library of answer. Another data source might be a public database accessed by API or a private data source from another system also access by API or via a database file delivered to a location in the cloud. In the second method, a human will check new answers on a periodic basis to ensure they are correct and confirm their submission to each library of information. Some embodiments include storing the correction of the erroneous data to a pool of known correct answers.

In an example embodiment, once incorrect data are detected by a rules engine 410, as discussed later in the application, a pop-up window could appear within the Cvent display. The pop-up window could be requested by the user, or could appear automatically upon detecting incorrect data. Pop-up windows appear automatically on pre-determined screens at times when the user is most likely to need assistance, or when requested by the user (via a button on the screen). For example, users need assistance when they first log in for the day as they may have forgotten which meetings have issues or need to be updated from their previous day's work. If the user asked to be reminded to revisit an issue (using a Reminder button on the screen) the issue will automatically re-surface when the user revisits that particular meeting or logs out and logs back into the Cvent application. The pop-up window may correspond with a response engine 412 to display suggestions to correct the data, guidance about the data, or what to do with the data next. The specific pop-up for the user could be driven by example embodiments of the instructions stored on the non-transitory computer readable medium.

Additionally, in an example embodiment, the operations may include outputting, based on the data entries, a report of the data entries. If the user desires a certain type of report, the user could click a report request 414 button on the screen and the operations in the non-transitory computer readable medium may render a specific type of report with current data for the user. In an example embodiment, the report delivery 416 may be in the form of a spreadsheet 416a.

In an example embodiment, a computing system could include the non-transitory storage medium and execute the instructions included there within. The computing system may further execute the target software and the example instructions on top of the target software. The computing system could further include certain hardware components. For example, a computer program may be distributed between an origination server, used by the target software, and a processing server that runs the method. The computer program may be connected to the two servers over a network. The program may include the user authentication context engine 404, an action engine 418, the rules engine 410, the response engine 412, and a report engine 424.

Further, an example computing system could include at least one processing unit and at least one non-transitory data storage, which could be integrated together or interconnected by a system bus, network, or other connection mechanism. The processing unit could comprise one or more general purpose processors (e.g., microprocessors) and/or one or more special purpose processors (e.g., application specific integrated circuits). And the data storage could comprise one or more volatile and/or non-volatile storage components (e.g., magnetic, optical, or flash storage). The example method could also output, on the computing system, a user interface for a user to view the results of the example operations. The computing system could include a system to display the user interface.

In one possible embodiment, the computing system includes a software module, logic engines, a database and computer networks. While the system may contemplate upgrades or reconfigurations of existing processing systems, the computing system could also operate without changes to existing databases and system tools. While the description references, specific technologies, hardware, equipment, system architectures and data management techniques, this description is but one embodiment and that other devices and/or methods may be implemented without departing from the scope of the invention.

Figure 5:
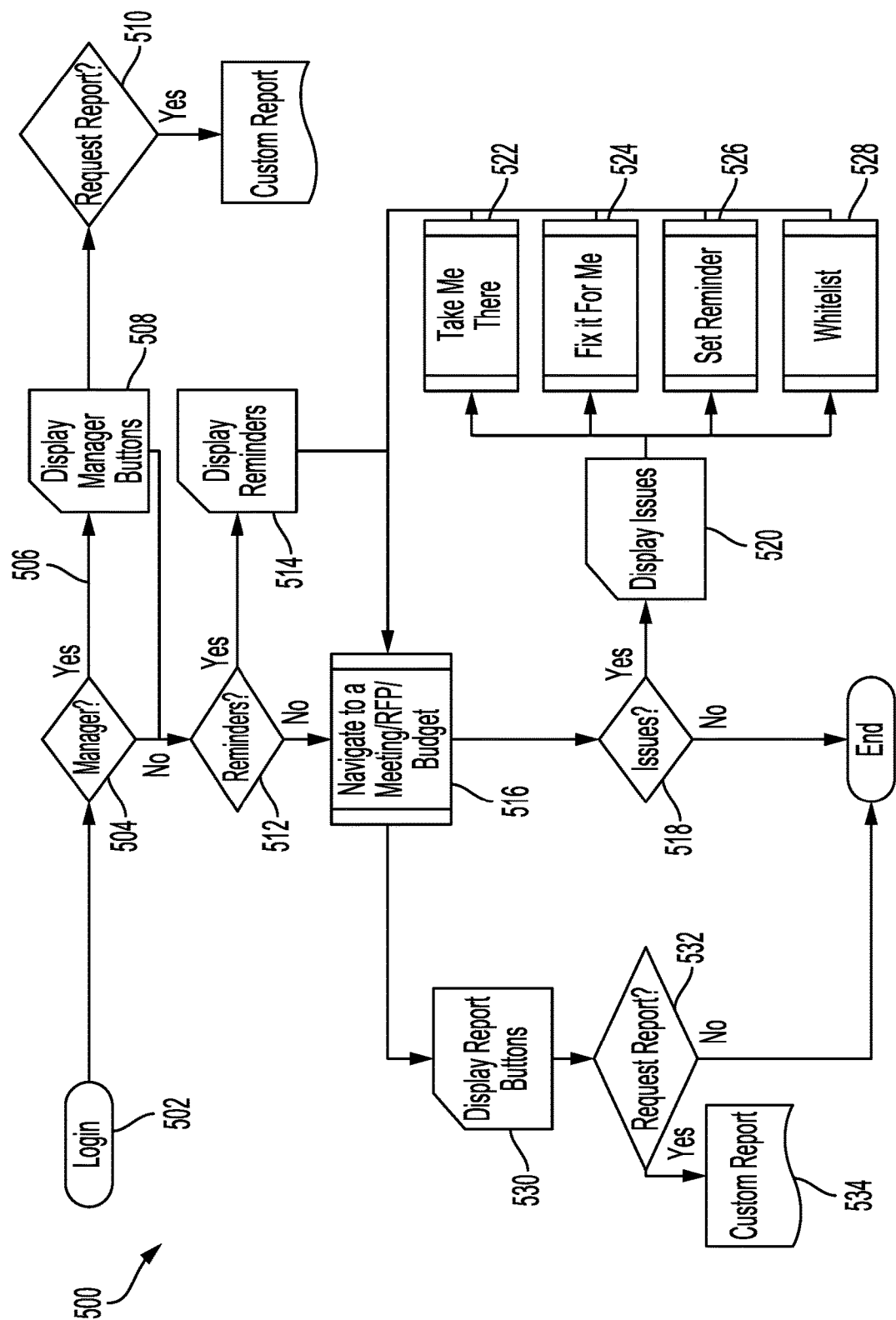
FIG. 5 illustrates a schematic block diagram of a user experience flow, in accordance with example embodiments.

FIG. 5 illustrates a possible user experience flow 500 for an example embodiment. As previously mentioned, a user could be a meeting planner who works on meetings or a manager of several meeting planners, with different functionality available for each role. At block 502, when a user or manager logs into Cvent, the system could include authenticating the user from Cvent, as mentioned above, and determining whether the user is in a manager role or not, at block 504. In some embodiments, the user can be classified as a manager based on a user registration process of a target software. For example, the system queries the role structure already determined in Cvent to identify a specific user and show them content only applicable to that user. Using the same information in Cvent, the system determines if the role of a user, i.e. planner, manager, administrator, etc. In an example embodiment, the system could then serve up the appropriate combination of reports and/or display guidance based on the role of the user. At block 506 the operations may include determining if the user is a manager, if the user is a manager the operations may display the manager buttons 508 for the user to request a report 510. Reports can be created by the system based on any data available in the Cvent system. Existing reports include Activity reports which include fields such as user names, number of errors open and "reminded", number of meetings visited within a certain period of time, Whitelist reports which include information on which planners have asked to whitelist issues, if the whitelist request was approved or denied, any detail or additional information about the whitelist, and the dates associated with all actions. Budget reports include information about the meeting location, number of attendees, all expenses related to the meeting, savings achieved during negotiation for contracting the services, and any additional information requested which can include any information available in Cvent or any calculation of information available in Cvent, such as specific costs divided by number of persons and attributable to each person. The reports or guidance could also be based on existing data in the system, consideration of historical data and historical norms, desired direction from management, historical actions, and other criteria as well as responses based on machine learning from other users' responses. An example of a report or information in a report based on machine learning are average costs for running meetings in a city. As the system compiles historical data based on, for example, costs in New York City for 5 star hotels, the system will use that information as median or average costs and flag meetings which are significantly over or under that level of cost for review. The system would suggest that the current low or high costs might be an error and ask the user to confirm the costs are correct or edit the costs if previously entered incorrectly.

Some embodiments may further include setting a reminder for the guidance selection in response to a command to set a reminder via the graphical user interface. In an example embodiment, if the user is not a manager, the operation could include, at block 512 notifying the user of reminders and displaying the reminders 514. The reminders may notify the user of an error in a previous data entry that has not been addressed. In some embodiments, receiving, from the user, the guidance selection further includes receiving a command through the user interface to correct erroneous data entries. A pop-up window and/or button, as shown in FIGS. 6A-7B, could appear on top of the Cvent screen with the possible errors. The operations may further include, at block 516, navigating to the meetings that the user is planning. If, in an example embodiment, the system detects issues 518 such as mistakes, missing data or a need for guidance, the system may display for the user 520 a list of meetings with issues and the total number of issues. In some embodiments, the guidance can include at least one of a correct data entry, an explanation of a data filed, or an instruction for entering data into a data field. The example embodiment could provide a hyperlink to go to a particular meeting to correct an issue or fill in missing data.

Moreover, when the user reaches a particular meeting, an example embodiment could include the operations serving up a list of all open issues for that meeting and a series of actions which can be taken in relation to each issue. The actions may include taking the user to the issue 522, fixing the issue 524, setting a reminder to fix the issue later 526, or marking the data as correct in a whitelist 528. The user could choose which action to take at that given moment for a particular issue. Alternatively, the user may be allowed to click a button to ask to be reminded of a particular issue at a later time, such as later in the day or later in the week.

In an example embodiment, the users could also run reports. The operations may include, at block 530 displaying report buttons and upon a request for a report 532, the operations may include outputting the report 534. The reports could contain information about which users and which meetings have open issues at any given time. In this way, a manager could choose which members of their team may need coaching or help at any particular time. In some embodiments, outputting the report can include retrieving information about the user, the user's location, and the user's actions in the system. To do this, some embodiments can include storing records of user actions, wherein outputting the report includes the record of the user actions. The manager may also choose not to evaluate or use certain data or information based on the number of existing errors in the data until such time as they are corrected.

Figure 6A:
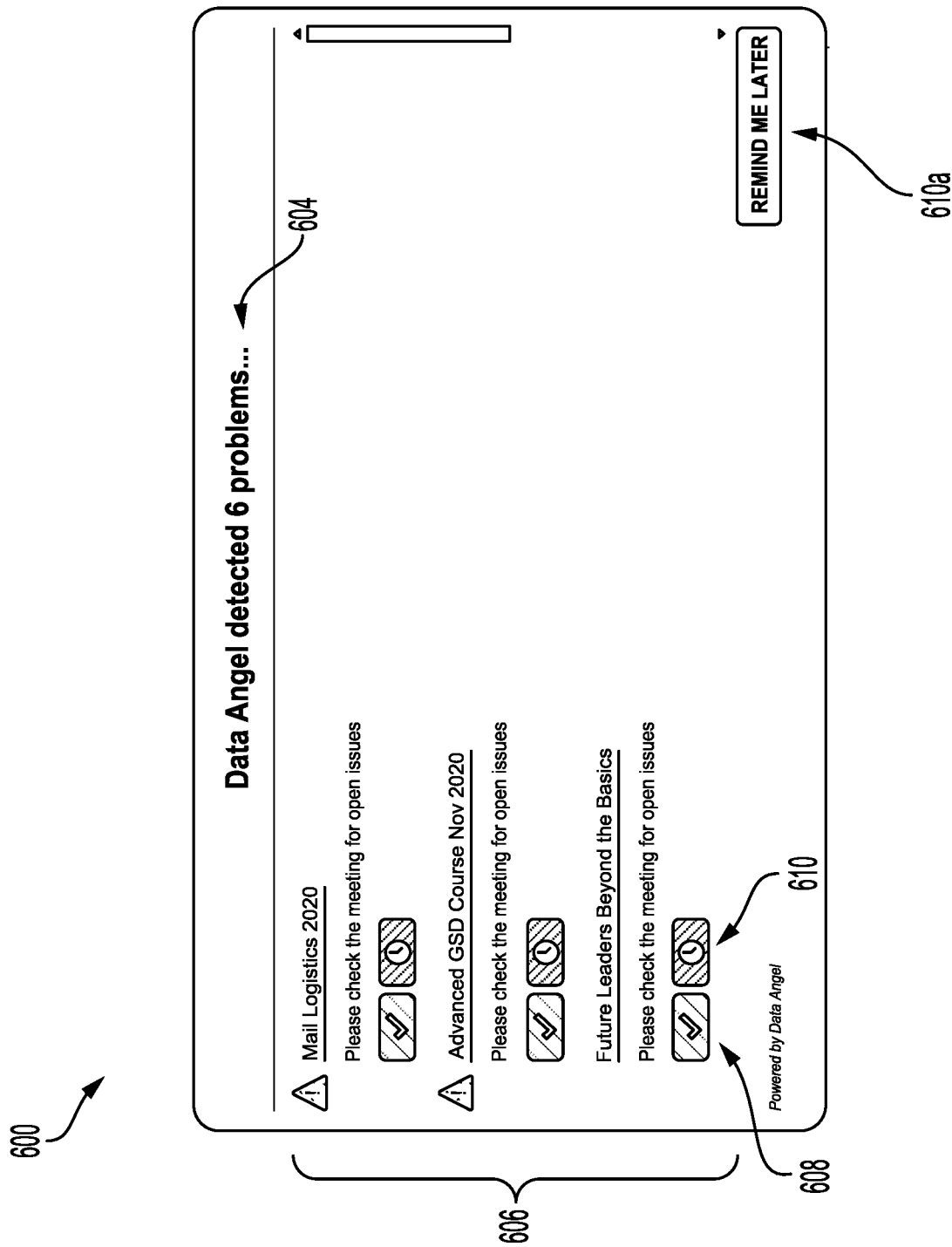
FIG. 6A illustrates an error page that a user may see upon login to the target system, in accordance with example embodiments.

FIG. 6A illustrates what a user might see when they login into an example embodiment implemented on a target system, specifically Cvent. In an example embodiment, upon logging into Cvent, a pop-up 604 could appear on the user interface 600. The pop-up could include a list of all meetings 606 which have possible errors, or meetings that need the user to make an adjustment in the data entered. From the pop-up, users could click on a "Go to" button 608 to choose to go to a particular meeting and work in that meeting.

Alternatively, users might use a "Remind Me Later" button 610 to delay the need to fix one issue or all issues for a predefined period. The reminder could be set for a single meeting level 610 or all meetings 610*a*. The predefined period to wait for a reminder could be a few hours, or a few days. The "Remind Me Later" function could remove the pop-up 604 from appearing for a certain period of time and after that time has expired, "remind" the user to correct it by activating that issue for the user once again. In an example embodiment, a manager may be able to set a limit on how many times a user selects the "Remind Me Later" button. When configuring the system for a particular client, the client may determine how many times users are allowing to "be reminded" on an issue before the user reaches their maximum and must address the issue. For example, the user may be allowed to use the "reminder" button 3 times before that button is no longer available and the user cannot proceed with any other action in the Cvent software until they address that particular issue in that particular meeting. All other actions in the system and the target system, Cvent, are disabled until the issue is resolved.

FIG. 6B illustrates a user interface 600 when a user logins into an example embodiment implemented on a target software, specifically Cvent. The system may include a reminder button 612 that appears whilst on the certain pages of the Cvent. For example, on the home screen of Cvent, viewed by the user immediately after logging into Cvent, the button may indicate to the user how many reminders are in place for that particular user at that particular moment across all of the meetings they are currently working on. A user could click on the button to get to the pop-up window which lists all meetings and reminders which the user must address in order to correct or complete their work.

Figure 7A:
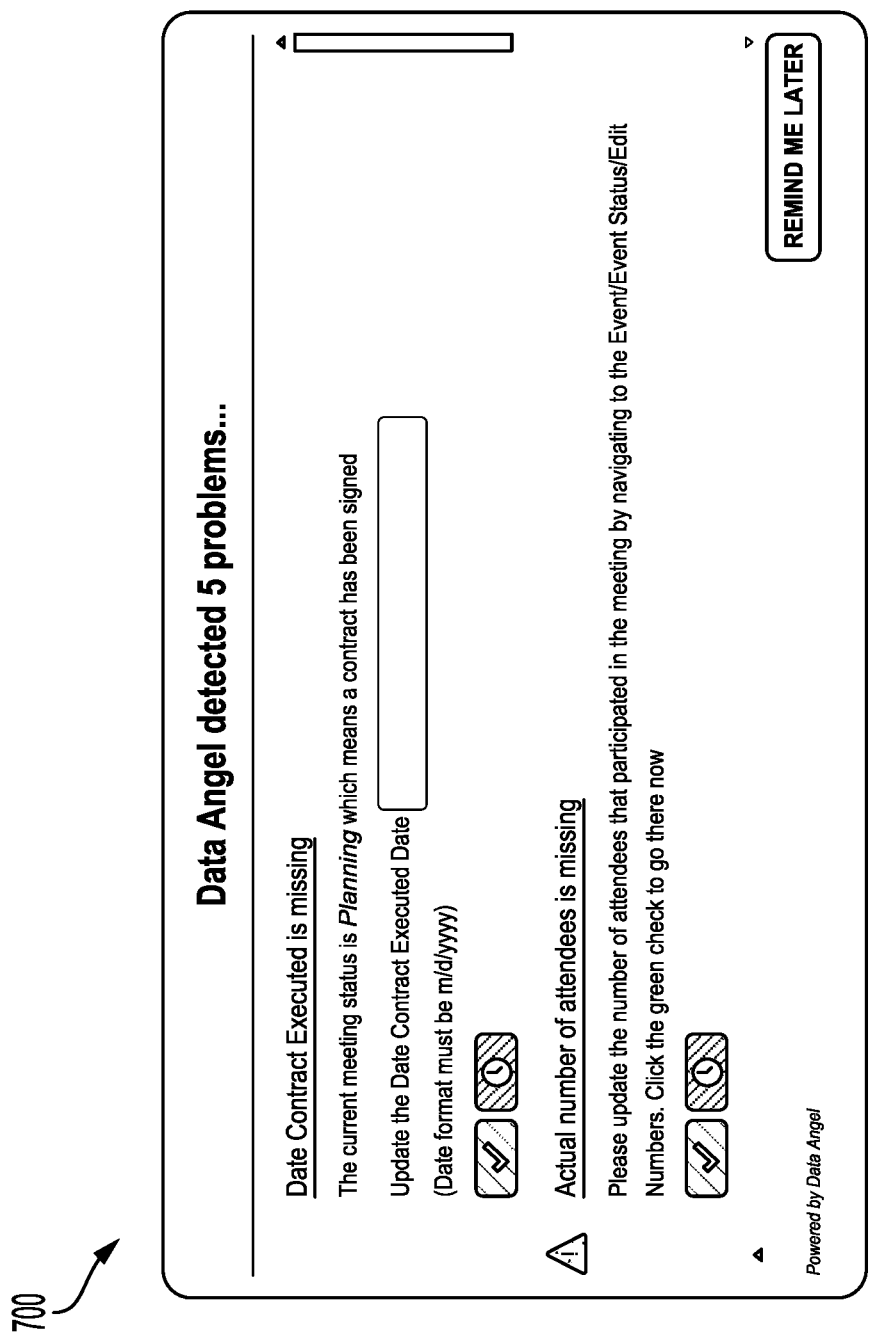
FIG. 7A illustrates an error page for a particular record, in accordance with example embodiments.

Once a reminder is acknowledged, an example embodiment can include a pop-up with a listing of all data errors for a particular meeting. FIG. 7A is an illustration of a pop-up 700 listing data errors that a user might see for a particular meeting they are working on within the target software. The pop-up may include the number of errors detected and the option to correct the errors, or the option to remind the user of the errors at a later time. An example embodiment may include four basic types of "issues" that the system might help the user find and resolve, as discussed below.

Issue Type 1: In issue type 1, the example system may identify data that are incorrect and correct said data. In an example embodiment, the operations may include comparing the data entered to a range included in a correct data entry to determine if there is an error. For example, if the meeting is for 10 persons and the budget is entered as $4 million USD, the system will identify that costs are out of historically acceptable ranges using machine learning, i.e. checking historical and learned data for comparison. If the data entry is outside of the range, the data may be incorrect. For example, the computing system that stores the non-transitory computer readable medium may have access to a historical data base of typical meeting statistics. The operations could include comparing the data entries to the historical data to determine if there is an error in the data entry. In an alternative embodiment, the operations may include comparing entered values in data entry fields to flag if one or more entries are incorrect. A simple example of this is where the user has added incorrectly, (i.e., 5 employees plus 5 customers=11 people in total). In this case, the example embodiment could offer the user multiple options such as:

a) Fix it for me, i.e., Would you like me to change your answer of total people to 10?
   a. In this case, a configurable response engine in an example embodiment could add up multiple fields and provide further efficiency by presenting the user with the option to have the data correction performed by an example embodiment rather than by the user navigating back to the erroneous data point, doing the addition themselves and keying in the answer "10" instead of their previous answer "11."
b) Take me there—i.e., Take the user to this specific area of Cvent that contains the error so the user can make the correction.
c) Remind me later—i.e., Set a reminder so the user can come back to this issue at some time in the future.

Issue Type 2: In issue type 2, the data the user entered into the target software may be incorrect based on a comparison to norms for this type of answer. The computing system that stores the non-transitory computer readable medium may have stored there on historical norms for meeting planning. Take the example from above, where the $4 million USD was out of the historically acceptable ranges. Alternatively, a machine learning algorithm could be trained on the typical correct data entries to learn when an entry is incorrect. In issue type 2, the error may be resolved in a different way than issue type 1. An example of this could be where the data available in Cvent, based on what the user previously entered, now appear to be incorrect. In this example the user could have entered a city name of "Praha" for the city where the meeting was being held. In this case, the example embodiment could have applied a machine learning algorithm to determine if a city name was known from a preloaded set of correct city spellings or acceptable city spellings. In this case, an example embodiment could offer the user multiple options such as:

a) Fix it for me, i.e., Would you like me to change your answer to "Prague"?
   a. In this case, the configurable response engine in example embodiment uses a predetermined list and AI or machine learning from previous users to present this user with options to have the data correction performed by the example embodiment.
b) Take me there—i.e., Take the user to the specific meeting page of Cvent so the user can make the correction.
c) Whitelist the issue—i.e., If the user believes the data entered was correct, or the user simply does not feel they provide a good answer or would like to explain extenuating circumstances, the user can whitelist the issue and the issue should not "show up" again in the error pop-up screen. For example, if the pop-up requests a hotel contract be uploaded into the system but the planner has requested this document from a client and been refused, the planner can use the whitelist feature to document that the planner cannot provide the document because the client has refused to provide the hotel contract to them. For some rules, if the user clicks on this "Whitelist" button an additional drop down or text field could appear to allow the user to enter a reason code or write free form text to log a "reason" that the data are correct although the data appear outside of the norms for this type of data, or the reason that they cannot provide the requested data or information. In some cases, the example embodiment could be programmed with artificial intelligence or machine learning to "learn" the new spelling and add it to a temporary list of possible new spellings. The example embodiment could flag these questions for a manager to review. The manager could verify and agree or disagree that the spelling "Praha" is an acceptable spelling of a city more commonly spelled "Prague" in the English language. If a manager agreed by checking yes to this spelling in the example embodiment software, the software could "learn" this new spelling and accept it in future uses by other individuals.

d) Remind me later—i.e., Set a reminder so that the user can come back to this issue in the future.

In another example embodiment, data are already available in Cvent for a category called "Savings." Savings might be defined as fees reduced during negotiations with a vendor by a meetings planner. Based on what data the user entered, the operations may determine that "Savings" appears to be too high to be realistic. In this example, the total cost of the meeting could be entered into Cvent as $2,000 USD. However, the Savings calculation available in Cvent could be showing Savings of $2 million USD based on erroneous data entry into several other fields. In this case, the example embodiment could have applied an algorithm that compares the budget to the savings and determines that if the savings is larger than the budget, the "Savings" result is flagged as an issue. Therefore, a $2,000 meeting with Savings of $2 million likely contains incorrect information. An alternative embodiment could include independently calculating an estimated savings based on compiling the historic average values for aspects such as dinners and housing etc. in the area of the meeting. If the Savings calculation is not within a range surrounding the independent savings calculation, then the Savings calculation will be flagged as an issue. In an example embodiment, the operations may also flag when an event's Savings are below a predetermined amount. Once it is flagged as an issue, an example embodiment could offer the user multiple options similar to above to correct the issue.

Previously, the "best" answer for data entry may be difficult to determine without the proper data and analysis tools. For instance, a rough estimate of the cost for one participant to attend a meeting may include an estimate of the cost of travel (e.g., airfare), the cost of lodging, the cost of meals and the cost of local transportation (e.g., taxis, subways) that are available from multiple data sources. In an example embodiment, the operations may include accessing historical travel, lodging and spend information or calculating such information based on custom programming to offer a "better" or "best" answer to the user.

Issue Type 3: In issue type 3, the data may be missing and should be entered by the user. In this case, the operations may include determining that, at a point in time in the meeting life cycle, a piece of information or data point should be available to the planner and hence entered into Cvent, however it is missing. This may be determined by checking each data entry field to see if it is empty. In an example embodiment, the data entry fields may be ranked based on importance and only the most important fields that are empty will be flagged. For example, on Day 1 of planning a meeting, a user may know that the event is in Texas, but has not yet completed a task of booking a hotel in Texas. Hence, the user may enter data in Cvent indicating it is likely that the meeting will be held in Austin, Texas Several weeks later, after the planner has completed a written contract with a hotel, information of the booking can be confirmed within Cvent. Whilst the user was negotiating with several hotels, it was not yet determined if a particular meeting would be held at Hotel A in Austin, Texas or Hotel B in Houston, TX Following execution of a contract with a hotel, the user can confirm the exact hotel and hotel address in Cvent. In this case, the example embodiment could offer the user multiple options for updating the hotel information such as:

a) Fix it for me, i.e. Would you like to confirm the meeting will be held at:
  a. Hotel A in Austin, TX
  b. Hotel B in Houston, TX
  c. Another hotel has been chosen In the event of choice C, the operations could include providing possible answers based on the previous information. An example embodiment could include applying a trained machine learning model to offer likely options based on previous actions that the planner has taken and previous history of use of a particular city or hotel to offer the most likely choices for the answer. For example, if another hotel name—Hotel C—is listed somewhere within all the data for that meeting in Cvent the system can offer Hotel C as a likely answer. If the planner enters a brand new hotel that the example embodiment software did not consider the software will "learn" that name and incorporate it into future suggestions However, the user could always enter a new answer. The example embodiment could offer the user other options as well, such as:

b) Take me there—i.e., Take the user to the specific area of Cvent with the data entry that is an issue so the user can make the correction.

c) Remind me later—i.e., Set a reminder so the user can come back to this issue at a later time.

Issue Type 4: In issue type 4, the user has reached a point in the Cvent software where additional guidance may be helpful. Guidance may be helpful suggestions or reminders in text about what to do next. That guidance may be particular to a company's standard operating procedures or more general. An example of this could be where a meeting has been cancelled and the user has a number of new fields to enter based on the financial agreements related to the cancellation. Based on a low number of cancellations being processed in the past, a user may not be experienced in completing cancellation tasks. The operations could include recognizing this low number, and providing guidance to the user. Because the user has not processed many cancellations previously, they may not recall what particular data is required for each field. An example embodiment may include a "pop up" new screen. The pop-up may offer guidance on what the planner should enter into particular fields in Cvent. The operations could be triggered by a user changing a status field in Cvent that denotes the status of meeting in the meeting lifecycle, e.g., from "Planning" to "Cancelled." When that change occurs, the operations could include checking other pieces of data in Cvent for the cancelled event such as existing entries for food and beverage or accommodation and suggest the next best steps on what financial information to enter into what fields to accurately capture the cancellation fees or other terms of the cancellation. For example, when a cancellation for a meeting occurs the system can review existing budget line items and suggest the user adjust them based on the particular circumstances of that cancellation. The system could suggest the financial charges for lunch may be cancelled but a new entry is made for a cancellation fee in the food and beverage category (based on existing meeting data and/or historical norms stored in a library). In an example embodiment, the pop-up could also explain, step by step, what actions the user could take next. The pop-up could also trigger a short instructional video about next steps, or include a hyperlink to a video stored in the example embodiment software. As previously discussed, if the planner enters a field of information incorrectly or it is likely to be incorrect, the example embodiment could continue to monitor and inform the planner of needed corrections until such time as the data are deemed complete and correct.

In another example, in the beginning of the meeting planning process, the user might enter information that they will be searching for the most appropriate hotel for a meeting in Prague by entering Prague into a field in Cvent for "Desired City." In an example embodiment, the operations could include checking the city entered into this field to determine if a specialist for the city, for example Prague, is listed in a specialist table in a database for the example embodiment. The specialized table can be compiled using the machine learning algorithm. For example, specialists previously used can be provided in the list. If a specialist is listed, the operations may include providing the information of the specialist to the user with a prompt to reach out to the specialist. For example, a pop-up could inform the user, "I see that you are planning to book a meeting in Prague. Did you know that Alexandra is a specialist on booking venues in Prague? You can reach her by email or phone at XXX." This type of assistance could be delivered for the user to seek help.

Figure 7B:
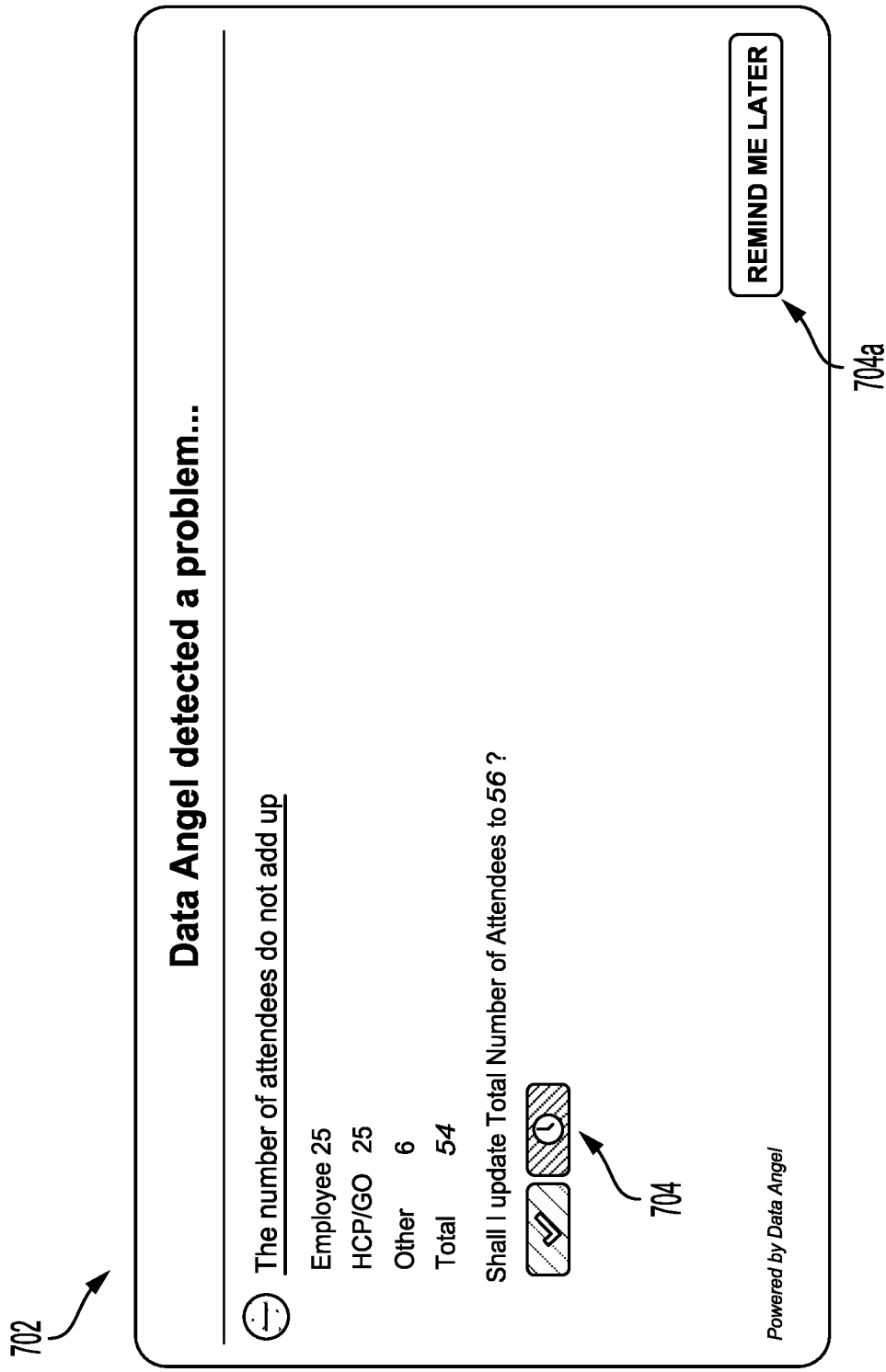
FIG. 7B illustrates a page that the user may see in a particular record after deferring corrections for some period of time, in accordance with example embodiments.

FIG. 7B is an illustration of a pop-up 702 that the operations may display on the user interface when the user has reached the limit of times they can be reminded of the issue before they must correct it in order to continue using the target software. This limit may be set as a default, or could be adjusted by a manager. The "Remind Me Later" buttons 704, 704a could be shown as no longer being available, and the user must now address the open issue.

Figure 8:
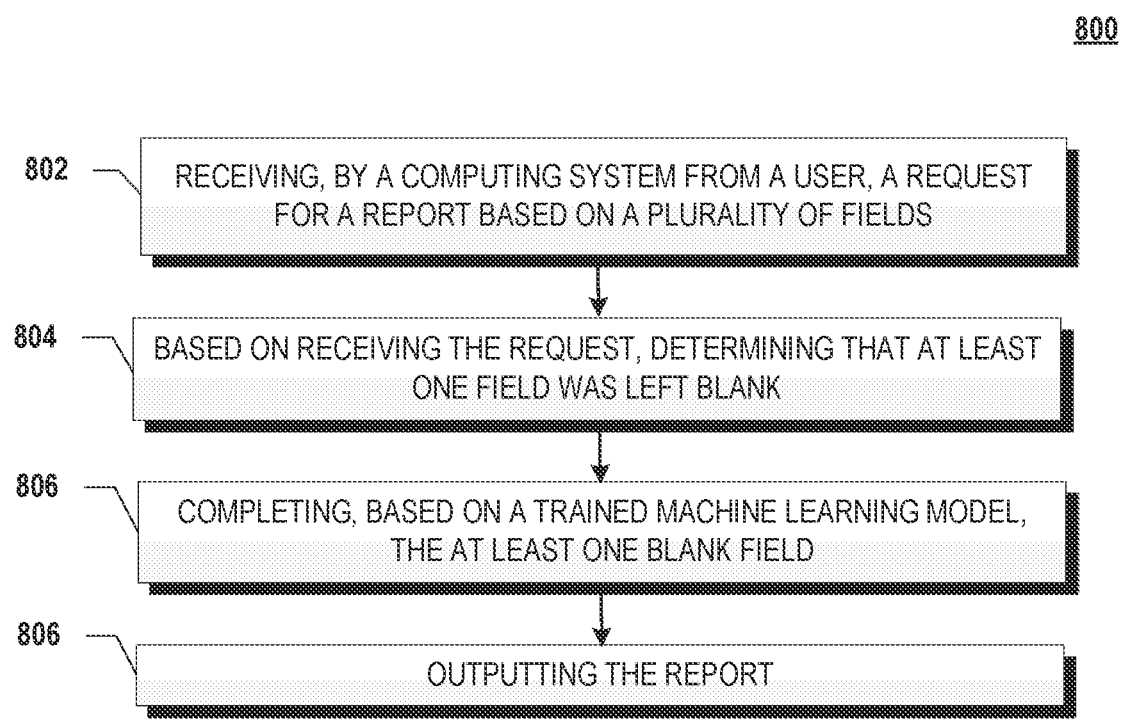
FIG. 8 illustrates a flow chart, in accordance with example embodiments.

FIG. 8 illustrates a flow chart illustrating an example embodiment 800. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device. The process can also be the method described herein.

The embodiments of FIG. 8 may be simplified by the removal of any one or more of the features shown therein. Further, these embodiments may be combined with features, aspects, and/or implementations of any of the previous figures or otherwise described herein.

Block 802 can include receiving, by a computing system from a user, a request for a report based on a plurality of fields.

Block 804 can include based on receiving the request, determining that at least one field was left blank.

Block 806 can include completing, based on a trained machine learning model, the at least one blank field and block 808 can include outputting the report.

Figure 9:
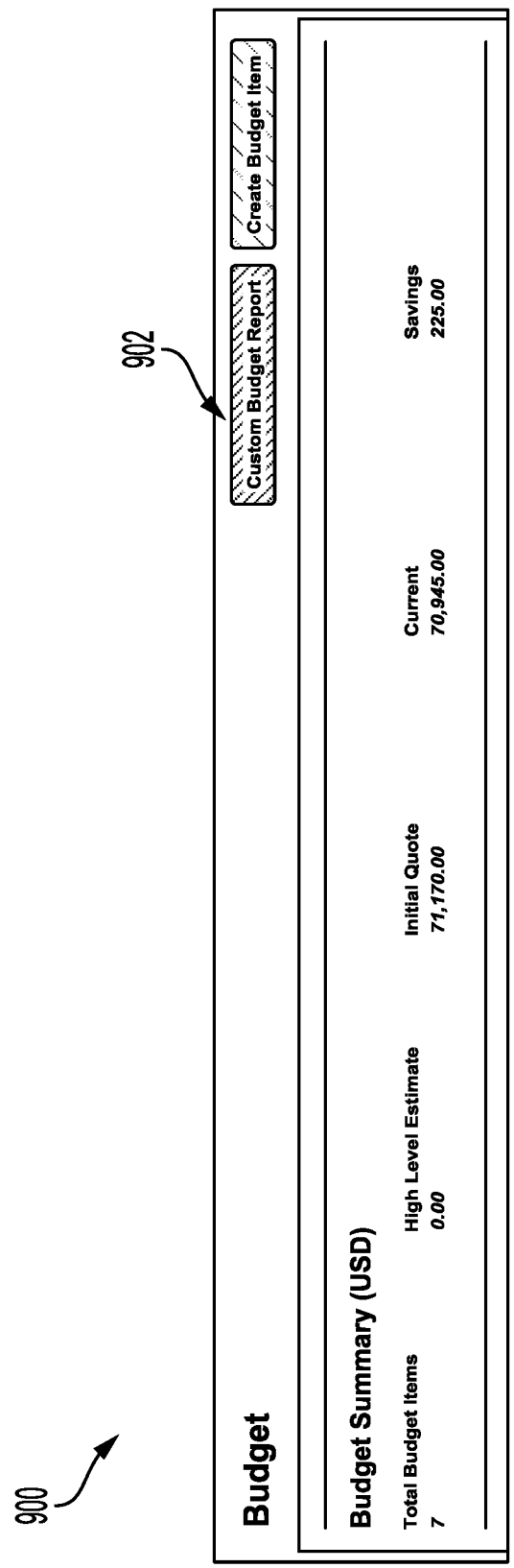
FIG. 9 illustrates a custom report button that the user may see to allow report creation, in accordance with example embodiments.

FIG. 9 is an illustration of a report button 900 which is added to a particular user's view to create single click reports. Users could be shown and allowed to access different reports down to the level of a single individual. As previously mentioned, reports can include details on a specific meeting, a group of meetings, such as one region of the world, or a specific set of software users (such as all users from a particular vendor engaged to plan meetings), or specific roles or titles, such as a set of users who are managers and above. The user access levels could be defined by the instructions in an example embodiment. As discussed previously, when a user logs into Cvent, the example embodiment could authenticate the user from Cvent, check a user access table stored on the non-transitory computer readable medium, and serve up the appropriate report or combination of reports based on the user's role. Buttons 902 for reports will allow users to access a formatted report based on a single click of the button. To produce a report, the example embodiment software could extract all necessary data from Cvent for that report using the API, create the report using Cvent and/or other stored data or data accessed from other systems, and "serve up" the report within the Cvent application to that particular user. The report could provide information for a particular meeting.

FIG. 10 is an illustration of a customized report 1000 created in response to selecting button 902. The custom report button 902 may allow a user to select a pre-formatted report 1000. In an example embodiment a user could determine the report fields, report branding, colors and design of report 1000. Reports could be customized to each client instance of the example embodiment. Reports could contain information and/or a format that is not native to the Cvent system. When the button 902 to request a report is clicked, the operations in the example embodiment may include retrieving all appropriate information from all areas of the Cvent software and other software or databases, perform calculations necessary to populate certain fields, such as fields that were left blank, add other forms of external data and serve up the user a customized, formatted report available in multiple formats (pdf, excel). As previously mentioned, the blank fields can be filled in with suggestions provided by a trained machine learning model. Further, upon requesting the custom budget report, the operations could prompt a user to specify what types of data the user wants in the report. Based on what the user wants in the report, the operations could further request the user to complete data entries with missing information, or correct data entries that are being used to create the custom report.

Historically, a report such as this would take many downloads of data, combinations of data and formatting to be created and could take from 5 minutes to hours to produce. An example embodiment might be programmed for this specialty report and produce it in under 10 seconds. The operations in the example embodiment may include retrieving the required data from multiple areas of Cvent, merging the Cvent data and data from other systems that the software has also retrieved, and performing the calculations necessary to populate specific items within the report. For example, if the report is to specify the "Carbon Footprint" of a particular meeting, or the amount of carbon dioxide and other carbon compounds emitted due to the consumption of fossil fuels which would likely be generated by a particular meeting or set of meetings, the information cannot be calculated or retrieved from Cvent directly. Some information would be retrieved by the example embodiment from Cvent (number of individuals flying from which city to which city) and other information, such as an estimate Carbon footprint of those flights, could be retrieved from a database stored on the non-transitory computer readable medium, or access to an external data source. The report could be generated within seconds and serve up to the user a customized, formatted report available in multiple outputs (pdf, excel, etc.). In this manner, consistency could be achieved when the desire is to provide report recipients with a standard look, feel, and standard metrics every time they receive a new report, to allow report recipients to compare performance over time or across meetings.

FIG. 11 is an illustration of a window 1100 having a team performance report button 1102 that may be available to managers. The button, which permits a user to generated a team performance report, is an example of how the operations could "serve up" access to particular reports based on role or other defining groups. In an example embodiment, the "Team Performance" report may only be accessible to managers, based a table of user and manager roles stored in a Cvent database. An example embodiment manager's report could contain all the details of the meeting planners use of Cvent for a particular set of time and how many errors from the example embodiment system were still "open" or outstanding. To access the report, a manager may click the button requesting the report, and the operations in an example embodiment may include retrieving all data on users who are in that managers group for open issues, a count of how many issues the user had resolved in the past weeks/month, and perhaps a summary of priority issues that the manager might coach the user to resolve quickly.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A non-transitory computer-readable medium having computer-executable instructions stored thereon that, if executed by a computing system, cause the computing system to perform operations, comprising:
   executing a meeting and event planning target application;
   receiving, from an application programming interface ("API") of the meeting and event planning target application, a plurality of data entries entered by a user via a graphical user interface of the meeting and event planning target application;
   determining an error in at least one of the plurality of data entries, wherein the error in at least one of the plurality of data entries is determined using a trained machine learning model;
   determining, based on the error, a plurality of responses, wherein the plurality of responses includes a suggestion, a request for correction of information, and an option to whitelist;
   sending an error and guidance command to the meeting and event planning target application, via the API, to present the error and guidance to the user based on the determined plurality of responses via the graphical user interface;
   receiving, from the user, a guidance selection, wherein the guidance selection is at least one of acceptance of the suggestion, corrected information, or a whitelist of at least one of the plurality of data entries as correct;
   in response to determining that the guidance selection was an acceptance of the suggestion:

sending a display command to the meeting and event planning target application, via the API, to display a correction of erroneous data via the graphical user interface;

storing the correction of erroneous data to a pool of known correct answers;

in response to determining that the guidance selection was an acceptance of the request for correction of information:

sending a navigation command to the meeting and event planning target application, via the API, to navigate to a page of the meeting and event planning target application where the correction may be provided; and in response to determining that the guidance selection is to whitelist at least one of the plurality of data entries as correct:

prompting the user to log (i) a reason that the at least one of the plurality of data entries is correct, or (ii) a reason that the user cannot provide an answer for the at least one of the plurality of data entries;

adding the at least one of the plurality of data entries to a whitelist of data entries; and retraining the machine learning model based on the whitelist of data entries.

2. The non-transitory computer-readable medium of claim 1 further comprising setting a reminder for the guidance selection in response to a remind command to set a reminder via the graphical user interface.

3. The non-transitory computer-readable medium of claim 1, wherein the guidance comprises at least one of a correct data entry, an explanation of a data field, or an instruction for entering data into a data field.

4. The non-transitory computer-readable medium of claim 1, wherein the plurality of data entries comprises at least one of values or locations.

5. The non-transitory computer-readable medium of claim 1 further comprising:

receiving, from the user, a user registration; and classifying the user as a manager based on the user registration of the meeting and event planning target application.

6. The non-transitory computer-readable medium of claim 1, wherein receiving, from the user, the guidance selection further comprises receiving a correction command through the graphical user interface to correct erroneous data entries.

7. The non-transitory computer-readable medium of claim 1 further comprising outputting, based on the data entries, a report of the data entries.

8. The non-transitory computer-readable medium of claim 7, wherein outputting the report further comprises retrieving information about the user, a user location, and user actions in the meeting and event planning target application.

9. The non-transitory computer-readable medium of claim 7 further comprising storing records of user actions, wherein the report includes the records of user actions, wherein the user actions comprise correction of information or whitelisting of at least one of the plurality of data entries as correct.

10. The non-transitory computer-readable medium of claim 1, further comprising:

receiving (i) the reason that the at least one of the plurality of data entries is correct, or (ii) the reason that the user cannot provide an answer for the at least one of the plurality of data entries, wherein (i) the reason that the at least one of the plurality of data entries is correct, or (ii) the reason that the user cannot provide an answer for the at least one of the plurality of data entries comprises a reason code or free form text.

11. A method, comprising:

executing a meeting and event planning target application;

receiving, from an application programming interface ("API") of the meeting and event planning target application, a plurality of data entries entered by a user via a graphical user interface of the meeting and event planning target application;

determining an error in at least one of the plurality of data entries, wherein the error in at least one of the plurality of data entries is determined using a trained machine learning model;

determining, based on the error, a plurality of responses, wherein the plurality of responses includes a suggestion, a request for correction of information, and an option to whitelist;

sending an error and guidance command to the meeting and event planning target application, via the API, to present the error and guidance to the user based on the determined plurality of responses via the graphical user interface;

receiving, from the user, a guidance selection, wherein the guidance selection is at least one of acceptance of the suggestion, corrected information, or a whitelist of at least one of the plurality of data entries as correct;

in response to determining that the guidance selection was an acceptance of the suggestion:

sending a display command to the meeting and event planning target application, via the API, to display a correction of erroneous data via the graphical user interface;

storing the correction of erroneous data to a pool of known correct answers;

in response to determining that the guidance selection was an acceptance of the request for correction of information:

sending a navigation command to the meeting and event planning target application, via the API, to navigate to a page of the meeting and event planning target application where the correction may be provided; and in response to determining that the guidance selection is to whitelist at least one of the plurality of data entries as correct:

prompting the user to log (i) a reason that the at least one of the plurality of data entries is correct, or (ii) a reason that the user cannot provide an answer for the at least one of the plurality of data entries;

adding the at least one of the plurality of data entries to a whitelist of data entries; and retraining the machine learning model based on the whitelist of data entries.

12. The method of claim 11 further comprising setting a reminder for the guidance selection in response to a remind command to set a reminder via the graphical user interface.

13. The method of claim 11, wherein the guidance comprises at least one of a correct data entry, an explanation of a data field, or an instruction for entering data into a data field.

14. The method of claim 11, wherein the plurality of data entries comprises at least one of values or locations.

15. The method of claim 11, further comprising:

receiving, from the user, a user registration via the meeting and event planning target application; and classifying the user as a manager based on the user registration of the meeting and event planning target application.

16. The method of claim 11, wherein receiving, from the user, the guidance selection further comprises receiving a correction command through the graphical user interface to correct erroneous data entries.

17. The method of claim 11 further comprising outputting, based on the data entries, a report of the data entries.

18. The method of claim 17, wherein the report includes records of user actions, wherein the user actions comprise correction of information or whitelisting of at least one of the plurality of data entries as correct.

* * * * *